(12) United States Patent
Avadhanam et al.

(10) Patent No.: US 8,626,774 B2
(45) Date of Patent: Jan. 7, 2014

(54) LOCATION BASED APPS RANKING FOR MOBILE WIRELESS COMPUTING AND COMMUNICATING DEVICES

(75) Inventors: Phani Bhushan Avadhanam, San Diego, CA (US); Xintian Li, Cupertino, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 62 days.

(21) Appl. No.: 13/356,535

(22) Filed: Jan. 23, 2012

(65) Prior Publication Data

US 2013/0191397 A1 Jul. 25, 2013

(51) Int. Cl.
*G06F 17/30* (2006.01)

(52) U.S. Cl.
USPC .......................................... 707/748

(58) Field of Classification Search
USPC .......................................... 707/748
See application file for complete search history.

(56) References Cited

U.S. PATENT DOCUMENTS

| | | | |
|---|---|---|---|
| 7,464,153 B1 * | 12/2008 | Abbott et al. | 709/224 |
| 8,396,759 B2 * | 3/2013 | Mehta et al. | 705/26.7 |
| 2002/0188589 A1 * | 12/2002 | Salmenkaita et al. | 707/1 |
| 2003/0004937 A1 * | 1/2003 | Salmenkaita et al. | 707/3 |
| 2004/0043758 A1 * | 3/2004 | Sorvari et al. | 455/414.1 |
| 2008/0263024 A1 * | 10/2008 | Landschaft et al. | 707/5 |
| 2009/0150535 A1 * | 6/2009 | Abbott et al. | 709/223 |
| 2010/0100512 A1 | 4/2010 | Brodin et al. | |
| 2010/0157989 A1 | 6/2010 | Krzyzanowski et al. | |
| 2010/0262619 A1 * | 10/2010 | Zargahi et al. | 707/770 |
| 2011/0093264 A1 * | 4/2011 | Gopalakrishnan | 704/235 |
| 2011/0105150 A1 | 5/2011 | Moon et al. | |
| 2011/0137881 A1 * | 6/2011 | Cheng et al. | 707/706 |
| 2011/0191330 A1 | 8/2011 | Barve et al. | |
| 2011/0191331 A1 | 8/2011 | Barve et al. | |
| 2011/0191332 A1 | 8/2011 | Barve et al. | |
| 2011/0320307 A1 * | 12/2011 | Mehta et al. | 705/26.7 |
| 2012/0253656 A1 * | 10/2012 | Brandt | 701/410 |
| 2012/0290583 A1 * | 11/2012 | Mahaniok et al. | 707/741 |
| 2012/0309411 A1 * | 12/2012 | MacGougan et al. | 455/456.1 |
| 2012/0309412 A1 * | 12/2012 | MacGougan et al. | 455/456.1 |
| 2012/0326922 A1 * | 12/2012 | Yang et al. | 342/357.3 |
| 2013/0005383 A1 * | 1/2013 | Isberg et al. | 455/517 |

* cited by examiner

*Primary Examiner* — Jean M Corrielus
*Assistant Examiner* — Evan Aspinwall
(74) *Attorney, Agent, or Firm* — Neugeboren O'Dowd PC

(57) ABSTRACT

Systems, methods, and apparatuses are disclosed for presenting applications to a user, via a mobile wireless communication device (user equipment), that are selected and ranked based on context information describing a location and type of motion of the user equipment, and/or a time that the ranking request was made, compared to context information describing the applications.

17 Claims, 5 Drawing Sheets

LOCATION BASED APPS RANKING FOR MOBILE WIRELESS COMPUTING AND COMMUNICATING DEVICES

BACKGROUND

1. Field

The presently disclosed embodiments relate generally to applications for touch devices and smart phones, and more specifically to ranking of such applications based on characteristics such as location, time, and type of user movement.

2. Background

Many UEs, appliances, and other networked devices now have the ability to run a broad variety of specialized apps (applications) and to allow the user to select and download ones that are of interest. As used herein, widgets are considered a subset of apps.

This added functionality has led to application stores (or app stores), that is, servers which maintain inventories and rankings of applications for purchase and download. Examples include the IPHONE APP STORE (APPLE), APP WORLD (BLACKBERRY), ANDROID MARKET (GOOGLE), LG APPLIANCE WEBSTORE (LG), OVI STORE (NOKIA), OPERA WIDGETS (OPERA), SAMSUNG APPLICATION STORE (SAMSUNG), PLAYNOW ARENA (SONY), VODAFONE WIDGETS (VODAFONE), V-CAST STORE (VERIZON), and many others.

These app stores can include hundreds of thousands of apps typically ranked according to popularity among users. Unfortunately, many useful apps and new, yet high-quality apps are not easily found via the current ranking systems. Keyword searches can be used, but users are not always able to think of keywords that will return relevant apps. Apps can also be browsed via category, but this option too is limited by keyword searching and popularity rankings within each category.

As a result, users spend exorbitant amounts of time searching for apps, and often do not find what they are looking for or do not find the most beneficial apps. Apps that could be beneficial, but do not fall within the user's purview are often never found. These approaches also may not take into consideration the personal interests or circumstances of a user. There is therefore a need in the art for improved systems and method for ranking apps.

SUMMARY

Illustrative embodiments of the present disclosure that are shown in the drawings are summarized below. These and other embodiments are more fully described in the Detailed Description section. It is to be understood, however, that there is no intention to limit the disclosure to the forms described in this Summary or in the Detailed Description. One skilled in the art can recognize that there are numerous modifications, equivalents, and alternative constructions that fall within the spirit and scope of the disclosure as expressed in the claims.

Embodiments of the disclosure comprise a remote wireless server system comprising a context information server and an application raking application running on an application ranking server. The context information server can have a context manager application and a context information processor. The context manager application can receive and store search terms describing desired applications and receive and store context data associated with a user equipment describing a location or type of motion of the user equipment and/or a time when the search terms were generated. The context information processor can analyze and convert the context data into a first context information associated with the user equipment. The application ranking application can compare the search terms and the first context information with a second context information associated with two or more applications. The application ranking application can further rank the two or more applications based on the comparing operation in order to generate a ranked list of applications selected from the two or more applications.

Other embodiments of the disclosure can include a method for ranking apps for use on a wireless communications device. The method can comprise receiving search terms from a user equipment and selecting two or more applications from an application library as those application most relevant to the search terms. The method can further include receiving context data from the user equipment describing a location or type of motion of the user equipment and/or a time when the search terms were generated. The method can also include converting the context data to a first context information and accessing a second context information describing the two or more applications. The method can finally include comparing the search terms and the first context information with the second context information to generate a ranked list of applications based on which of the two or more applications are most relevant to the search terms and the first context information.

Further embodiments of the disclosure can comprise a user equipment. The user equipment can have a means for generating context data and a means for transmitting the context data to a context information server. The user equipment can further include a means for receiving a ranked list of applications from an application ranking server and a means for displaying the ranked list of applications to a user. The user equipment can also comprise a means for receiving a user selection of one or more applications from the ranked list of applications and a means for downloading and installing the one or more applications on the user equipment.

Still further embodiments of the disclosure can include a non-transitory, tangible computer readable storage medium, encoded with processor readable instructions to perform a method for ranking applications for download and install to a user equipment. The method can comprise receiving search terms from a user equipment and selecting two or more applications from an application library as those application most relevant to the search terms. The method can further include receiving context data from the user equipment describing a location or type of motion of the user equipment and/or a time when the search terms were generated. The method can also include converting the context data to a first context information and accessing a second context information describing the two or more applications. The method can finally include comparing the search terms and the first context information with the second context information to generate a ranked list of applications based on which of the two or more applications are most relevant to the search terms and the first context information.

DETAILED DESCRIPTION

The word "exemplary" is used herein to mean "serving as an example, instance, or illustration." Any embodiment described herein as "exemplary" is not necessarily to be construed as preferred or advantageous over other embodiments.

To overcome the aforementioned challenges in the prior art, when a user searches for apps, the search results can be ranked based on search terms or categories of apps provided by the user along with context information (e.g., location, time, and movement) describing the user equipment (UE). These can be compared to context information describing the app or an entity associated with the app to determine the ranking. The context information can be associated with the UE or an app via metadata in the app or tagging of the app, to name two examples.

Figure 1:
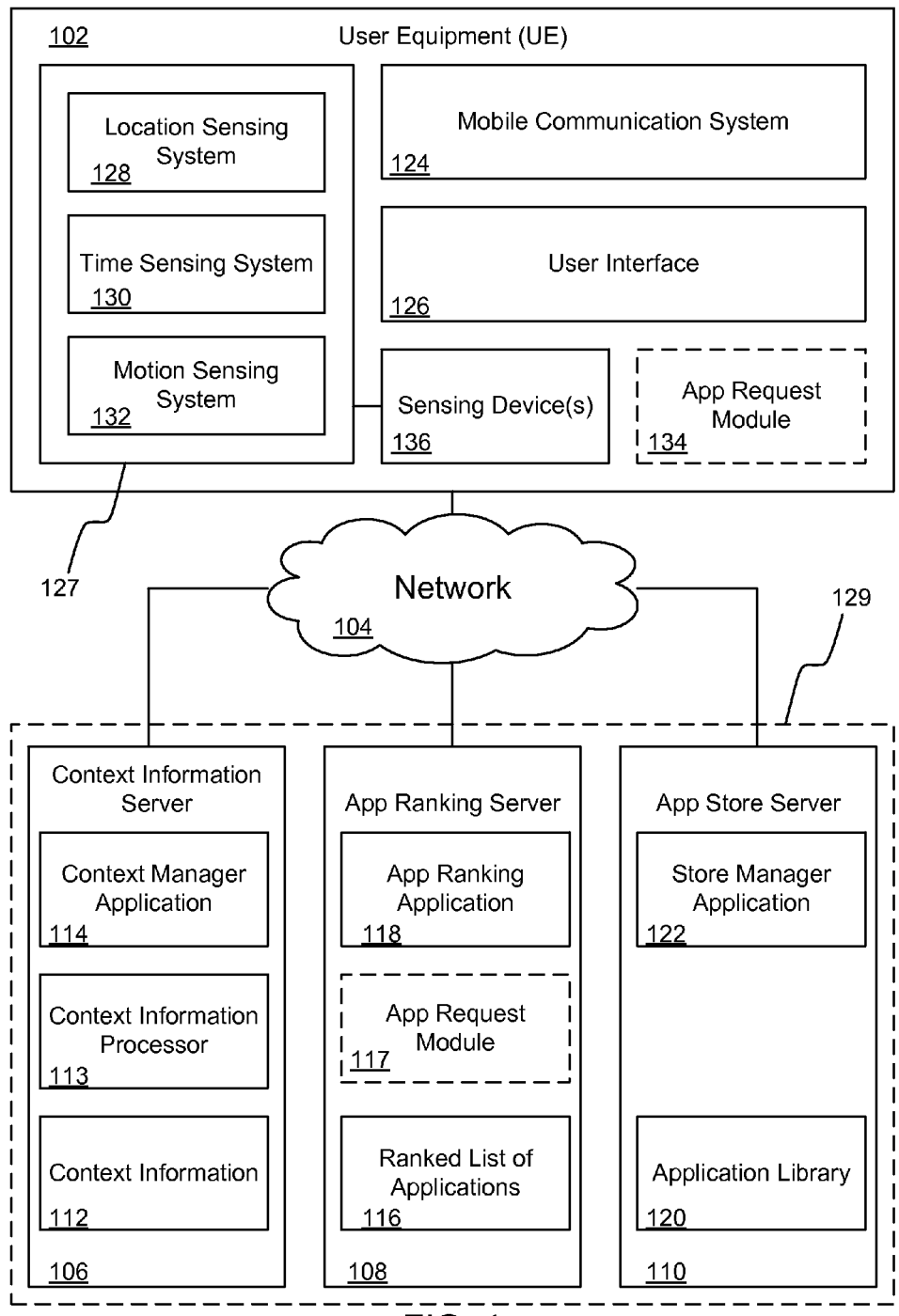
FIG. 1 is a block diagram of a user equipment, an associated network communication system, and a remote server system including remote servers.

FIG. 1 is a block diagram of a UE 102, an associated network communication system 104, and a remote server system 129 including remote servers 106, 108, 110. The UE 102, associated network communication system 104, and servers 106, 108, 110 are configured to provide application suggestions and application rankings to the UE 102 based on context information (e.g., location, movement, and/or time characteristics shared between the UE 102 and a plurality of apps) and optionally search terms or a preferred category of applications that the user provides. The UE 102 may be configured to communicate with a context information server 106, an app ranking server 108, and an app store server 110. This communication can be facilitated by the network communication system 104 (or network), which can also facilitate communication between the servers 106, 108, 110 and other UE and between the UE 102 and other UE. The servers 106, 108, 110 are configured to suggest apps for download and installation to the UE 102 and to rank apps for download and installation based on context information, search terms or a category provided by a user via the UE 102, as well as other factors such as user rankings and number of user downloads per app.

While current app ranking systems base app ranking on user preference for an app and/or a number of user downloads for an app, the herein disclosed systems, methods, and apparatuses seek to provide more relevant app search suggestions and search result rankings by also considering the context in which a user is searching for an app (e.g., context information). Context information for the user (or UE 102) along with context information associated with each app, can in combination, be used to select and rank more relevant app suggestions and search results for a user than was possible in the art. Context information for the user (or UE 102) can include, for instance, the UE 102 location, type of motion, and a time when the app ranking request is made. Context information for the user or UE 102 may also relate to the search terms or application category that the user provides. Context information associated with each app can include, for example, location (e.g., "near COOR'S FIELD" or "on the DC Mall"), time (e.g., "9 am," "afternoon," or "Christmas time"), or a type of motion (e.g., "walking," "running," or "riding a bus").

The following discussion of the system illustrated in FIG. 1 will be described in combination with the method illustrated in FIG. 2. Initially an optional app request module 134 running on the UE 102 or an optional app request module 117 running on the app ranking server 108 makes a request for apps. The request can include search terms provided by the user. For instance, a user can search for apps in the APPLE APPSTORE or the ANDROID MARKETPLACE by entering search terms. The app request can also be made automatically by the app ranking server 108 or the app store server 110, either of which can automatically suggest apps for the UE 102 to present to the user. The search terms can also describe a category of desired applications, such as sports, restaurants, or business applications.

The request can be received by the remote server system 129 (assuming the request is made by the UE 102) (Block 202) and can be fulfilled by a combination of the context information server 106 and the app ranking server 108. The remote server system 129 can select two or more applications from an application library 120 residing on the app store server 110 (Block 204). The context information server 106 can be configured to receive and convert context data to context information 112 from the UE 102 (Blocks 206 and 208) and access context information describing the two or more apps (Block 210). The context information can be stored in the context information server 106 as context information 112.

A context manager application 114 running on a context information processor 113 of the context information server 106 can manage handling and storage of the context information 112. For instance, the context manager application 114 can receive context data from the UE 102 and convert it to context information 112. The context manager application 114 can also extract context data or information from the UE 102 by tracking UE 102 activities and app downloads in order to collect location, time, and motion data that is extracted as context data and converted to the context information 112. Rather than extracting context data from the UE 102, the context manager application 114 can also (or alternatively) directly monitor the UE 102 location, time, and motion and generate the context information 112 from the monitoring. The context manager application 114 can also extract context information 112 describing apps from the apps themselves. For instance, the context manager application 114 may read metadata in the XML of an app or read metadata or tags associated with the app. In other words, the context manager application 114 extracts context information 112, stores it, and organizes it on the context information server 106.

The app ranking server 108 includes an app ranking application 118, which accesses an apps library 120 residing on the app store server 110 to determine what apps are available for download and installation on the UE 102. The app ranking application 118 also analyzes the context information 112 and selects and ranks some or all of the apps in the apps library 120 as a ranked list of applications 116 (Block 212). The app ranking application 118 can then provide the ranked list of applications 116 to a store manager application 122 that can provide the ranked list of applications 116 to the UE 102. Alternatively, the app ranking application 118 can provide the ranked list of application 116 directly to the UE 102, thus bypassing the store manager application 122. This embodiment can be useful where one wants to bypass a traditional app store such as the APPLE APP STORE and create an independent app store.

The application library 120 may include app data for each app. The application data may include information about the apps that can be downloaded from the app store server 110.

For each app, this information may include the name of the app, a description of the app, the cost of the app, and/or metadata relating to the app. This information may also include information about where a copy of the app may be downloaded, such as one or more URL addresses where the app may be downloaded from, such as that of the app store server 110.

The store manager application 122 may be configured to manage all aspects of an application purchase and/or download transaction. For example, the store manager application 122 may be configured to obtain a requested application from the application library 120, to process billing and/or payment related to the purchase of the app, and/or to download that app to the requesting UE 102. The store manager application 122 may be configured to perform these tasks automatically without further input from the user or may present the user with one or more dialog boxes, such as a dialog box requesting confirmation of the purchase transaction.

The servers 106, 108, 110 can all be part of a server system 129, which includes one or more servers able to perform all the functions described above with reference to the servers 106, 108, 110. In other words, one of skill in the art will recognize that the components, modules, servers, processors, applications, information, and libraries within the server system 129 have been described as logical blocks that can be implemented in a variety of hardware, software, and firmware combinations. For instance, the servers 106, 108, 110 could operate on one physical server or on multiple physical servers, for instance where three virtual servers operate on a single piece of computing hardware. As another example, the functionality of the context information server 106 can be combined with the functionality of the app ranking server 108 onto one set of one or more servers while the functionality of the app store server 110 can be carried out by another set of one or more servers.

The UE 102 includes a mobile communication system 124 configured to manage communications to and from the UE 102. The UE 102 also includes a user interface 126 (e.g., a touchscreen display or a combination of a keyboard, mouse, and display) where the user can enter a search request and the ranked list of applications 116 can be displayed when returned from the app ranking server 108 or the app store server 110. The UE 102 may also include sensing systems 127 for providing context data or context information 112 to the context information server 106. These can include a location sensing system 128, a time sensing system 130, and/or a motion sensing system 132.

The location sensing system 128 can determine a location of the UE 102 (e.g., via GPS, cell tower triangulation, user entry of coordinates or an address). The location sensing system 128 may be of any type. For example, it may include a GPS chip set configured to determine the geographic location of the UE 102 based on positioning signals from global satellites. The location sensing system 128 may in addition or instead include an architecture that uses both GPS as well as network elements to determine position (AGPS). The location sensing system can in addition or instead use cell tower triangulation to determine position based on the nearest cell tower ID. These are just two non-limiting examples of implementations of the location sensing system 128.

The location sensing system 128 may optionally operate with a sensing device(s) 136, such as a GPS receiver. For instance, the sensing device(s) 136 can be a GPS receiver or accelerometer, while the location sensing system 128 can be software, hardware, firmware, or a combination of these that operates to translate the GPS signal into context data. Alternatively, the sensing device(s) 136 can provide context data to the location sensing system 128, which is then converted to context information 112 by the context information server 106 or by the location sensing system 128 and then passed to the context information server 106.

The time sensing system 130 can provide a time stamp or other time context information associated with the UE 102 (e.g., 12:01 pm). For instance, when a user makes an app search request, the time sensing system 130 may attach a time stamp to the query as it is sent to the app store server 110. Alternatively, the time sensing system 130 may be foregone, since the app store server 110 or the context information server 106 can ascertain a time of an app query and use this time. In other words, time is more universally measurable than location and type of motion, and therefore the time sensing system 130 may not be needed.

The time sensing system 130 may optionally operate with the sensing device(s) 136, such as a digital clock signal generator. For instance, the sensing device(s) 136 can include a clock signal generator, while the time sensing system 130 can be software, hardware, firmware, or a combination of these that operates to translate the clock signal into context data. Alternatively, the sensing device(s) 136 can provide context data to the time sensing system 130, which is then converted to context information 112 by the context information server 106 or by the time sensing system 130 and then passed to the context information server 106.

The motion sensing system 132 can determine what type of motion or movement the UE 102 (and therefore also the user) is engaged in. Some non-limiting examples of types of movement include, stationary, walking, running, biking, driving, riding public transportation, flying, boating, riding a ferry, and riding a train. The motion sensing system 132 may even determine what carrier is being used in the case of commercial transportation (e.g., UE 102 began flying at a time that corresponds to and is traveling along a flight path corresponding to United flight 608 to Newark). Location, speed, and acceleration can be determined via GPS or cell tower triangulation, to name two non-limiting examples.

From this example it should be apparent that in some cases context data is generated that overlaps for location and type of motion, for instance where location and a type of motion are both determined based on GPS coordinates. The context manager application 114 can take this context data and determine a UE 102 location and type of motion from it.

As the list of exemplary types of movement makes apparent, the motion sensing system 132 may simply measure a speed of motion, but may also perform more complex analyses of motion. For instance, merely measuring a speed of the UE 102 will not differentiate between a user that is driving a car and a user that is riding a bus or a train. For such differentiation the motion sensing system 132 might look at speed, location relative to known bus or rail lines, and locations where acceleration, deceleration, and stoppage occur. If the UE 102 has been traveling along the same route as a particular public bus, and stoppage points corresponding to one or more known bus stops on the route have been observed, then the motion sensing system 132 can conclude that the mode of transportation is a bus rather than a car. The motion sensing system 132 may also monitor for a threshold density of wireless signals in order to determine whether a UE 102 is on public transportation or not (e.g., more high strength signals will be measured on a bus or train than in a car due to the density of cell-phone-using passengers). These examples are merely illustrative of the plethora of ways in which types of motion can be determined and the plethora of factors that can be used to make such determinations.

The motion sensing system 132 may optionally operate with the sensing device(s) 136, such as an accelerometer or GPS receiver. For instance, the sensing device(s) 136 can include an accelerometer, while the motion sensing system 132 can be software, hardware, firmware, or a combination of these that operates to translate the accelerometer signal into context data. Alternatively, the sensing device(s) 136 can provide context data to the motion sensing system 132, which is then converted to context information 112 by the context information server 106 or by the motion sensing system 132 and then passed to the context information server 106.

It will be understood that the sensing systems 127 can be implemented in any combination of hardware, software, or firmware. For instance, the location, time, and motions sensing systems 128, 130, 132 could be executable code operating on a processor of the UE 102 or could be multiple processors running different executable codes.

The sensing systems 127 can generate data that the context information server 106 can convert to context information, or the sensing systems 127 can generate context information and provide the same to the information server 106. For instance, the motion sensing system 132 can determine a type of movement based on UE 102 speed, location, and acceleration in an embodiment and pass the type of movement to the context information server 106 as context information 112. Yet, in another embodiment, the motion sensing system 132 can measure speed, location, and acceleration of the UE 102 and pass this context data to the context information server 106, where this context data can be analyzed to determine the type of movement and stored as context information 112.

The context information 112 can be stored in a non-volatile memory of the context information server 106. The context information 112 can also be stored in temporary memory such as RAM, buffer, or cache of the context information server 106.

Context data can be raw data acquired from a sensing device 136 or the sensing systems 127, and that has not been analyzed. Context data is converted into context information 112 either by the sensing systems 127 or by the context information server 106. Context information 112 can also be extracted from apps or analysis of apps.

Context information 112 associated with apps can include tags (e.g., restaurant, grocery, coupons). Tags can be broad (e.g., "Christmas time" or "riding a bus") or narrow (e.g., "December 24$^{th}$, 5:00 pm" or "riding the 83× bus") or anywhere in between. Tags can be metadata associated with an app or can be embedded in the app code (e.g., the XML). Where there are no tags, the context manager application 114 can assign a tag to an app, for instance by analyzing the app code and/or searching the Internet for references to the app that can provide context information 112.

Context Information—Location

Context information 112 describing location can include, but is not limited to, latitude, longitude, altitude, and addresses, distances (or radii) from points of interest (e.g., city centers, event centers, stadiums, airports, or restaurants), distance (or radii) from the UE 102 (including vertical, horizontal, and three-dimensional distance), floor numbers of buildings or others structures. Context information 112 describing location can describe the UE 102 location and/or describe a location associated with an app. Context information 112 describing UE 102 location is often extracted from the UE 102, while context information 112 describing a location associated with an app is often extracted from the app itself.

The app ranking application 118 can access the context information 112 stored on the context information server 106 in order to select and rank apps from the application library 120. The app ranking application 118 can use the context information 112 describing location to determine distances, elevation changes, and routes between the UE 102 and a location associated with an app. Apps associated with locations that are closer to the UE 102 location can be ranked higher. Alternatively, only those apps associated with locations that are within a threshold distance (or radii) of the UE 102 may be returned as search results or suggested to the user. In another embodiment, apps within a threshold distance of the UE 102 may receive a ranking boost, but still be ranked according to a number of factors including location context information 112, while apps outside the threshold distance are ranked without regard to location context information 112.

Context information 112 describing location can include vertical distances, floor numbers, and/or elevations. These can be used, for instance, in the context of an elderly or injured user searching for apps (or having apps suggested to them by the app store server 110). Such users may be far less interested in apps associated with locations that the user is unable to, or has difficulty, reaching (e.g., locations that are far from the user in the vertical dimension). For instance, an athlete who recently sprained an ankle and temporarily has great difficulty with stairs may be uninterested in apps that are associated with locations requiring the user to climb stairs to get to. Apps associated with locations that did not require large elevation changes, or ascending stairs, might be ranked higher for this user. This is just one of many examples where the app ranking application 118 may consider vertical distances when ranking apps.

Context information 112 describing location can take the form of tags associated with each app. For example, apps that provide games, video clips, travel guides, or duty-free catalogs may each be associated with the tag "airport," since each of these apps may be relevant to a person who is at or is going to an airport. Similarly, apps that calculate waiter tips, provide restaurant reviews, provide nutritional guides, or translate words may each be associated with the tag "restaurant," since each of these applications may be relevant to a person who is at or is going to a restaurant. Another example is the tag "grocery store" for coupon applications, nutritional applications, price comparison applications, and loyalty card applications. A single app may have multiple tags associated with it. For example, a video game app may have the tags "airport," "bus terminal," and "train" associated with it. Tags can be applied by an application developer (or app developer) or automatically by the context manager application.

Even where an app is tagged with location context information 112, the information may not be in the same form across apps, thus making it difficult to compare the context information 112 of different apps. For instance, apps often have different location data types (e.g., GPS coordinates versus an address), or some apps have location tags while others have coordinates. In another case, one app may have context information 112 describing a parcel of land (a two-dimensional location) rather than an address (a one-dimensional location). In other instances, apps may not even include location data.

To overcome this challenge, these various forms of context information 112 can be transformed into a common information type that is more easily compared between apps. For instance, location data for a plurality of apps may be transformed into geographical coordinates (e.g., latitude and longitude) or an address. Thus, for instance, where one app may have address information associated with it (e.g., embedded in the app executable code) another app may have latitude and longitude coordinates associated with it, but both of these examples of context information 112 describing location can be stored on the context information server 106 as addresses. For example, latitude and longitude coordinates could be extracted and transformed into address information while the address information could be extracted but not transformed.

In one embodiment, various types of context information 112 describing location can be extracted and transformed into a single type of context information 112 via geocoding. Geocoding is the process of deriving associated geographic coordinates (often expressed as latitude and longitude) from other geographic data, such as street addresses, or zip codes (postal codes). Reverse geocoding is the opposite: deriving an associated textual location such as a street address, from geographic coordinates. For instance, transforming address information into latitude and longitude. As an example of geocoding in action, imagine that an app for online pre-ordering of Moe's Mondo Mud Muffins includes address information in the app that allows users to link to a smartphone's mapping application and get directions to Moe's. The systems and methods herein disclosed can use this address information to rank the Moe's app in terms of location. However, the address information is not easily compared to other app location data such as geographical coordinates. Geocoding takes the address information in the Moe's app and transforms it into latitude and longitude coordinates or any other data type that can be commonly compared between apps.

Geocoding and reverse geocoding are not limited to geographical coordinates, like latitude and longitude, or textual location, such as address. They can also deal with the following non-limiting list of location data types: neighborhood, town, city, zip code, area code, county, municipal district, state, region (e.g., Western United States or "the South" or "the Bible Belt"), time zone, country, group of countries (e.g., European Union), and continent.

Geocoding does not have to be applied to every app to be ranked. Sometimes, some apps may already include the common location data type. For instance, the system may try to associate address information with each app. Some apps may already have address information embedded in their code, and thus geocoding can be skipped relative to these apps. As such, all apps can have the common location data type despite not all having geocoding applied to them.

The location used to determine ranking may not be a current location of the UE 102. For instance, where a user is on a bus and likely to get off at a certain bus stop, the UE 102 location can be considered the bus stop—a future location. Alternatively, the bus route can be considered the UE 102 location such that apps having context information 112 describing locations near the bus route are ranked higher than other apps. These are two examples show that UE 102 location need not be limited to the UE 102 current location and can include a range of locations (e.g., a bus route).

In some embodiments, there may be a ranking preference for apps sponsored by the owner of land that a UE 102 is on or near. An app sponsored by the owner of land that the UE 102 is on may automatically be ranked highest or may be given a substantial ranking boost. Alternatively, when the UE 102 is within a threshold distance of the land owned by an app sponsor, the app may be ranked highest or given a substantial ranking boost. For instance, when a user enters a BEST BUY parking lot or store, and searches for apps related to electronics, the BEST BUY app may be preferentially given the #1 ranking regardless of other context information 112 or factors such as number of user downloads.

Context Information—Time

Time context information associated with apps can include at least any of the following: seconds, minutes, hours, days, weeks, months, years, decades, and centuries. More specific examples include happy hour, 9 am, wake up, lunch, sunset, weekend, Valentine's Day, the third week of being unemployed, and a first wedding anniversary, to name a few. Time context information can be absolute (e.g., 11:11 pm on Nov. 11, 2011 or midnight on January 1), can be a range (e.g., 5 pm to 8 pm), or can be related to a given event (e.g., ten minutes before the KISS concert or within ten hours after the start of Black Friday). Context information 112 describing time can describe the UE 102 time and/or describe a time associated with an app. Context information 112 describing UE 102 time is often extracted from the UE 102 or the context information server 106 at the time that an app search is made, while context information 112 describing a time associated with an app is often extracted from the app itself. Time context information for the UE 102 can include a time stamp generated when the request for a ranking of apps is made or when it is received.

The app ranking application 118 can access the context information 112 stored on the context information server 106 in order to select and rank apps from the application library 120. The app ranking application 118 can use the context information 112 describing time to determine how much time separates the search from the time associated with the app or whether the search is taking place during a time period or range specified by the context information 112 of the app. The user can also specify a time or period of interest in the search query.

Apps having time context information closest to a time at which the query is made or closest to a time specified in the query, can be assigned higher rank. As one example, a Black Friday application may have time context information indicating that the Black Friday application is most relevant near Black Friday. A MACY'S REWARDS CARD member application may have or be paired with time context information indicating that the app is most relevant around Christmas (a time period rather than a specific time). When a user performs a search that returns both these apps on November 20, the Black Friday app may be ranked higher since November 20 is closer to Black Friday than to Christmas.

In another embodiment, apps having a smaller time range can be assigned higher rank. For instance, a Black Friday application may have time context information related to the two weeks preceding Black Friday. A MACY'S REWARDS CARD may have time context information related to the three months prior to Christmas. A user searching for a shopping app may come across both of these apps during the week preceding Thanksgiving, and while the time context information should indicate that both are equally-relevant, since the Black Friday app has a shorter time span for the time context information 112, it would be ranked higher than the MACY'S app. This feature may encourage app developers to be more specific in their tagging of apps.

Apps can also have time sensitive context information. For instance, higher rankings may only be assigned to apps when they appear on search results during the time sensitive period. For instance, the Black Friday app may only receive a higher ranking until Black Friday. Once the time sensitive period has passed (once Black Friday has passed), the time sensitive context information no longer gives the Black Friday app a ranking advantage.

Context information 112 describing time can take the form of tags associated with each app. A single app may have multiple time tags associated with it.

Even where an app is tagged with time context information 112, the information may not be in the same form across apps, thus making it difficult to compare the context information 112 of different apps. In other instances, apps may not even include time data. To overcome this challenge, these various forms of context information 112 can be transformed into a common information type that is more easily compared between apps.

Some apps may not have any time data. In such cases, time data can be inferred. For instance, the app may have received thousands of comments in an app store or on Internet forums and review sites, and some of these comments may mention one or more times associated with the app. The context manager application 114 can analyze these comments and ascertain a time to associate with the app.

Context Information—Motion

Context information 112 describing movement can be associated with either or both of the UE 102 and the app. Types of movement described by this information can include, for example, stationary, running, walking, driving, riding a commuter rail, flying, and boating, to name a few. Apps having motion context information 112 matching or closest to the type of movement that the UE 102 is involved in can be ranked higher. For instance, given a user who is on a plane, apps having tags or automatically-generated context information indicating that they will be most relevant to user's traveling on planes can be ranked higher.

The motion context information 112 can be based on a current motion of the UE 102 or on recent motion. For instance, even though a user stopped running three minutes ago, the motion context information 112 might still indicate moving or running for the UE 102. As another example, the app ranking application 118 or context information manager 114 may determine that a user is traveling on a bus and that the user typically exits at a particular bus stop.

Context information 112 is not limited to the location, time, and type of motion context information 112 described above, although these descriptions do provide one of skill in the art with sufficient description and examples to allow them to implement other types of context information 112. Essentially, any context information 112 that can be gleaned via the sensing systems 127 described, or similar sensing systems, and context information 112 associated with apps, can be used to provide more relevant app search results to users.

A number of variations on the disclosed embodiments that were not explicitly described, should be apparent to one of skill in the art. For instance, while the examples of location, time, and motion context information 112 have made it appear that only one of these contexts affects app ranking, one of skill in the art will understand that this was done merely to simplify the explanation and examples of context information 112. In application, rankings can be based on a combination of the location, time, and motion context information 112, along with other factors such as user rankings and number of app downloads. Search terms as well as or in addition to context information 112 associated with the UE 102 can be used. Furthermore, the rankings can be biased towards one or more of these aspects based on weighting factors (e.g., location context information may have greater weight than time context information 112). Rankings can even see different weight given to different context information 112 of the same type. Weighting can be based on the source of context information 112 or the way in which it is combined and analyzed with other context information 112. The existence or non-existence of certain types of context information 112 can also affect weighting. The specificity of context information 112 provided by app developers can also affect rankings.

One or more types of context information 112 can be used in combination. For instance, location, method of travel, and time of travel can be used in combination. In particular, where the user is elderly, the location of an app may be close at hand, but a large number of steps without any wheelchair access points may stand between the UE 102 and the location associated with the app such that the app will be ranked lower than it would be based solely on distance. So, the app ranking application 118 may not only calculate a distance between the UE 102 and locations associated with apps, but it may also determine how long it will take the user of the UE 102 to reach the locations and how difficult such a journey might be. In contrast, where a number of apps are within easy walking distance of the UE 102 via streets and sidewalks, such factors as time of travel may not be that relevant.

As another example, even though there are a large number of stairs between the elderly user and a location associated with an app, this fact may not be detrimental to the app's ranking during certain times of day—when an elevator is functioning, which would allow the elderly user easier access to the location associated with the app.

In another instance, app ranking can be based on context information 112 and one or more traditional ranking factors. For instance, an app can be ranked based on location context information 112 and number of user downloads of the app. In particular, the ranking may be based on a number of user downloads, but only users that are within a threshold distance (or radii) of the UE 102 are considered when counting the number of user downloads. As seen, various types of context information 112 can be combined, or combinations of context information 112 and traditional ranking factors can be made, in order to better determine a relevance of an app to a user.

Context information 112 is also not limited to location, time, and type of motion. In the case of the injured or elderly user, the context information 112 would also describe the user's state (e.g., elderly, injured, young, business professional, etc.). In the case of determining a user's type of motion (e.g., on a bus or in a car), context information 112 may include an automated Internet search for bus routes, bus stops, and expected time of travel. Many other types of context information 112 besides location, time, type of motion are envisioned.

While numerous embodiments have been described where context information 112 is generated and compared for both the UE 102 and the app, in other embodiments, the UE 102 need not be associated with context information 112. Instead, search terms that the user enters into an app query can be compared to context information 112 associated with the app (e.g., tags) in order to find apps that are most relevant to the user's interest. For example, the search request may specify an interest in certain types of locations associated with apps, such as business, retail stores, restaurants, listings in Yellow Pages, local social networking opportunities, and/or GPS navigational points of interest. The app request module 134 may be configured to allow a user to specify these location types through the user interface 126. In some embodiments, a combination of UE 102 context information 112 and app search terms can be compared to app context information 112 in order to select and rank a set of app search results or suggestions.

Ranking and Weighting

Ranking of apps and the weighting applied to different context information 112 will now be described. The app ranking application 118 can base its ranking on any one or more of location, time, type of movement, and other types of context information 112 not explicitly described, along with traditional app ranking bases such as user rating, app usage, and quantity of downloads. For instance, a ranking of apps can be based on both user ratings and location. When two or more types of context information 112 are used to rank apps, different weights can be assigned to each type of context information 112. For instance, location may be given greater weight than type of movement. Where one or more types of context information 112 are used along with traditional ranking factors (e.g., number of user downloads or user popularity), weighting can again apply. For instance, context information 112 may be given greater weight than the traditional ranking factors.

Even within a given type of context information 112, weighting can be applied. For instance, given an AMC movie theatres app, the app ranking application 118 can look at the user's history of movie interests (e.g., via a recent history of trailers that the user has viewed or movies that the user has looked up movie times for at FANDANGO.com) and give greater weight to movie theater locations where movies are playing that are likely to interest the user. In other words, if the user is searching for apps at two different AMC theaters, but one of them is playing at one or more theatres that the user is more likely to be interested in, then the AMC app is more likely to be found near the top of the search results when the user searches for apps in the vicinity of that theater. As another example, different apps may be ranked in terms of a distance from the UE 102, where increased distance means that an app will be ranked lower than apps that are closer. However, this difference in ranking may be more exaggerated in rural areas than in cities, because of a determination that it takes longer to travel the same distance in rural areas than in cities (e.g., due to less-extensive road and public transit options). In other words, a search for an app in the city where the location associated with the app is 0.5 miles from the UE 102, will be ranked higher than a search for a similar app in a rural area that is also 0.5 miles from the UE 102. In this way, the app ranking application 118 can take into account, not just context information 112 (e.g., location and distance), but also how that context information 112 translates into real world relevance (e.g., travel time is a more important contextual indicator than mere distance).

Weight may be given to context information based on the source of the context information 112. As one example, where an app is tagged by the app developer and also automatically tagged via the context manager application 114, the automatic tag may have greater weight than the app developer tag.

Context information 112 may also have different weight depending on the way in which it is combined with other types of context information 112. As an example, context information 112 describing elevation may have little relevance too, and is thus assigned little weight, for most users. However, for injured or elderly users, this same context information 112 may have much greater weight.

Rankings can also take into account whether an app is associated with a certain type of context information 112 or not. In some embodiments, where apps do not have some form of context information 112 (e.g., there is location context information 112 but no type of motion context information 112), rather than trying to infer or automatically generate context information 112, apps lacking context information 112 can merely be ranked lower than apps having this type of context information 112.

Because of the incentive for app developers to broadly tag their apps such that their apps are ranked higher in a greater number of user searches, rankings may also take context information 112 specificity into consideration, and give greater weight to more specific context information 112. For instance, where the context information 112 is in the form of a range (e.g., December 1-December 31 or within the city limits), apps having a smaller range of values can be ranked higher, thus creating a disincentive for app developers to overly broaden their tags. For instance, two apps being ranked based on distance from a user may have location tags described as "Michigan" and "the Michigan Tech campus." A user searching for an app who is within Michigan, may find that the app tagged with "the Michigan Tech campus" is higher ranked than the app tagged with "Michigan", all else being equal, because the former had more specific context information 112. This aspect of the disclosure may encourage developers to apply more specific tags to their apps.

The prior art typically ranks apps based on user preference or ranking and number of user downloads of a given app. However, more importantly than user preference and number of downloads would be user preference as given by a set of users having similar interests or characteristics to the user searching for an app. Also useful would be a number of app downloads in a given area or at a given time or while engaged in a given type of motion. In other words, contextualizing the number of downloads for a given app. When a user requests a ranking of apps that may be relevant to skiing they typically receive a combination of skiing games, ski equipment retailer apps, snow forecast apps, etc, and these apps are ranked in large part on the number of other users that have downloaded each app. However, this disclosure improves on this ranking method by also looking at the number of downloads for a given app in a location, time, or while engaged in a type of movement that is found to be relevant to the user and the user's search.

In an embodiment, a ranking of apps is based in part on a number of user downloads of an app at or near a location described by the location context information 112. This can include a location that is within a threshold distance of the UE 102 or that is within a threshold distance of a location referenced in the user's search terms. As one example, an app can be ranked higher if the UE 102 is near a location near which a large number of other users also downloaded the app. In another embodiment, the ranking of apps is based in part on a number of user downloads of an app at a time that falls near a time or within a time range defined by context information 112 describing time. One example, includes ranking an app higher because the search was for Valentine's Day apps and a large number of users downloaded the app within the few weeks preceding Valentine's day. In another embodiment, the ranking is based in part on a number of user downloads of an app occurring while the downloading user was engaged in a type of motion that matches the motion described in the context information 112. For instance, an app can be ranked higher if the UE 102 is on a plane and a large number of users downloaded the app while on a plane.

Metadata and Tagging

The following is a more in depth discussion of tagging and metadata associated with apps. Apps can be associated with context information 112 via code embedded in the app (e.g., metadata in the resource file of the XML) or metadata associated with the app code or via tagging that occurs prior to or during app upload to an app store. In an embodiment, context information 112 can be derived from or provided by app developers (e.g., via categorizing his/her app) and users (e.g., via tracking user activity). An app developer can add metadata to the app code or associate metadata with the app when uploading the app to an app store. In this way, the app developer has a level of control over how his/her app is ranked based on context information. For instance, the app developer can embed an address or GPS coordinates in the app code or can associate a time period with his/her app before uploading the app to an app store. McDonald's, for example, might be tagged with metadata such as "restaurant", "fast food", and/or "American food." These tags may be the same as are used to categorize the service in a telephone directory. While the app developer can assign these tags to an app, they may also be automatically assigned by looking up the particular service organization and its associated classification(s) in a telephone directory or an Internet-based source of company information.

Alternatively, when uploading an app to an app store, the app store may present the app developer with context information inputs such as text boxes for inputting context information or radio buttons for selecting predefined context information. In one example, an app store may present a text box to app developers allowing the developer to enter words or phrases describing the app's context.

In another example, an app store upload interface may include radio buttons for selecting categories of context information that they believe their app fits into. For instance, upon uploading an app, the app store may present an app developer with twelve radio buttons each associated with a month of the year. App developers can select any one or more of the radio buttons to indicate a time context for their app when uploading. While they have the option of selecting all twelve months and thus covering a broader time context, the app rankings may also rank apps with smaller time context ranges higher thus encouraging app developers to be more selective in the months used to indicate a time context for their apps. These are just some of the many ways that app developers can tag their apps or otherwise provide context information 112 associated with their apps.

Apps can also be automatically tagged or associated with context information 112. Automatic tagging can occur where an app does not have any context information 112 (e.g., the app developer did not tag the app or the app is a legacy app created before context tagging comes into being). The context manager application 114 can be primarily responsible for automatic tagging. For instance, the context information manager 114 can extract and/or assign context information from apps that have been uploaded to the app store but were not tagged by an app developer. This can be desirable for legacy apps—those that were uploaded before context tagging came into being.

Automatic tagging can extract information from a variety of sources and perform various analyses in order to determine proper context information 112 for an app. For instance, an app may have received thousands of comments in an app store or on Internet forums and review sites, and some of these comments may mention one or more locations associated with the app. The context manager application 114 can analyze these comments and ascertain a location to associate with the app. In another example the app developer or company, whose name may be extracted from the app, can be found via an Internet search, and the app can then be associated with the location of the app developer or development company. As another example, apps can be automatically associated with brick-and-mortar locations related to the app. Gas stations, businesses, theme parks and others may have location associations based on a brick-and-mortar address, to name a few examples. For instance, a BEST BUY app may be automatically associated with location context information 112 identifying BEST BUY store locations. An AMC movie theaters app can automatically be associated with GPS coordinates of its theaters. An app related to Christmas food recipes can be automatically associated with Christmas time. An app for SOUTHWEST AIRLINES can automatically be associated with the flying type of motion.

Automatic tagging may be based on user action. The context manager application 114 can track usage of apps that have been downloaded to UEs and in this way ascertain what location, time, type of movement, and other context information 112 should be associated with an app. In this way, more objective location, time, and motion context information can be ascertained than when an app developer provides context information. For instance, an app developer for Papa Pronto's Pizza may indicate an address and a ten mile radius for location context information, the ten mile radius covering the delivery zone for Papa's. Yet, the context manager application 114 may receive usage data for the app showing that 98% of users download and use the app within a residential neighborhood East of Papa's. Perhaps the West side of Papa's is an oil refinery and industrial complex where very little pizza orders are made. The context manager application 114 could then automatically assign location context information 112 as the West side of Papa's within a 10 mile radius. The context information 112 would thus favor the residential side of Papa's since people in the refinery and industrial complex have demonstrated little interest in the Papa's app. This example shows just one of many ways that automatically derived context information 112 can override or be used in combination with context information 112 provided by app developers.

In some embodiments, app developers may not be given the opportunity to provide context information 112. Instead, automated tagging by the context manager application 114 may be the only source of context information 112 for the apps that are uploaded to the application library 120.

These examples of tagging apps and associating them with context information shows just a fraction of the many ways that apps can be assigned context information both by the app developers and by autonomous systems such as the context manager application 114.

The purpose of the ranking may affect what context information 112 is automatically associated with an app. For instance, a sports team's app could be automatically associated with the location of the home stadium when a first search is made. However, in a different search context, the location associated with the sports team's app could be the closest stadium in which the sports team was playing. For instance, for a Boston user in Kansas City searching for BOSTON REDSOX apps, one or more apps related to the Red Sox may be associated with the location of the Kansas City Royals baseball stadium or the next closest rival stadium, the COLORADO ROCKIES COORS FIELD. What these examples show is that the context information 112 associated with an app may depend on the type of app search or the type of user doing the search.

The discussion now turns to some of the other system components of the UE 102. The mobile communication system 124 may be of any type. For example, it may include a transmitter, a receiver, one or more data processing sub-systems, and/or other components. The mobile communication system 124 may be in communication with the user interface 126, which facilitates input and output of information between the UE 102 and the user. The user interface 126 may include any type of user interface device, such as a microphone, loud speaker, headphone, earphone, display (including touch screen), mouse, and/or keyboard.

In another embodiment, the app request module 134 may periodically, or according to a pre-programmed schedule, transmit the request to one or more of the servers 106, 108, 110.

The network communication system 104 may be configured to facilitate communication between UEs, such as the UE 102, and servers, such as the context information server 106, the app ranking server 108, and the app store server 110. The network communication system 104 may have any configuration to facilitate this functionality. For example, the network communication system 104 may include one or more mobile communication networks, the Internet, one or more gateways, one or more local area networks, and/or one or more wide area networks.

One of skill in the art will understand that the servers discussed above are abstract representations of logical blocks that in application can be part of a single rack of servers in one location, can be remote computers in different locations, or can be distributed between two or more computers at one or more locations.

Figure 2:
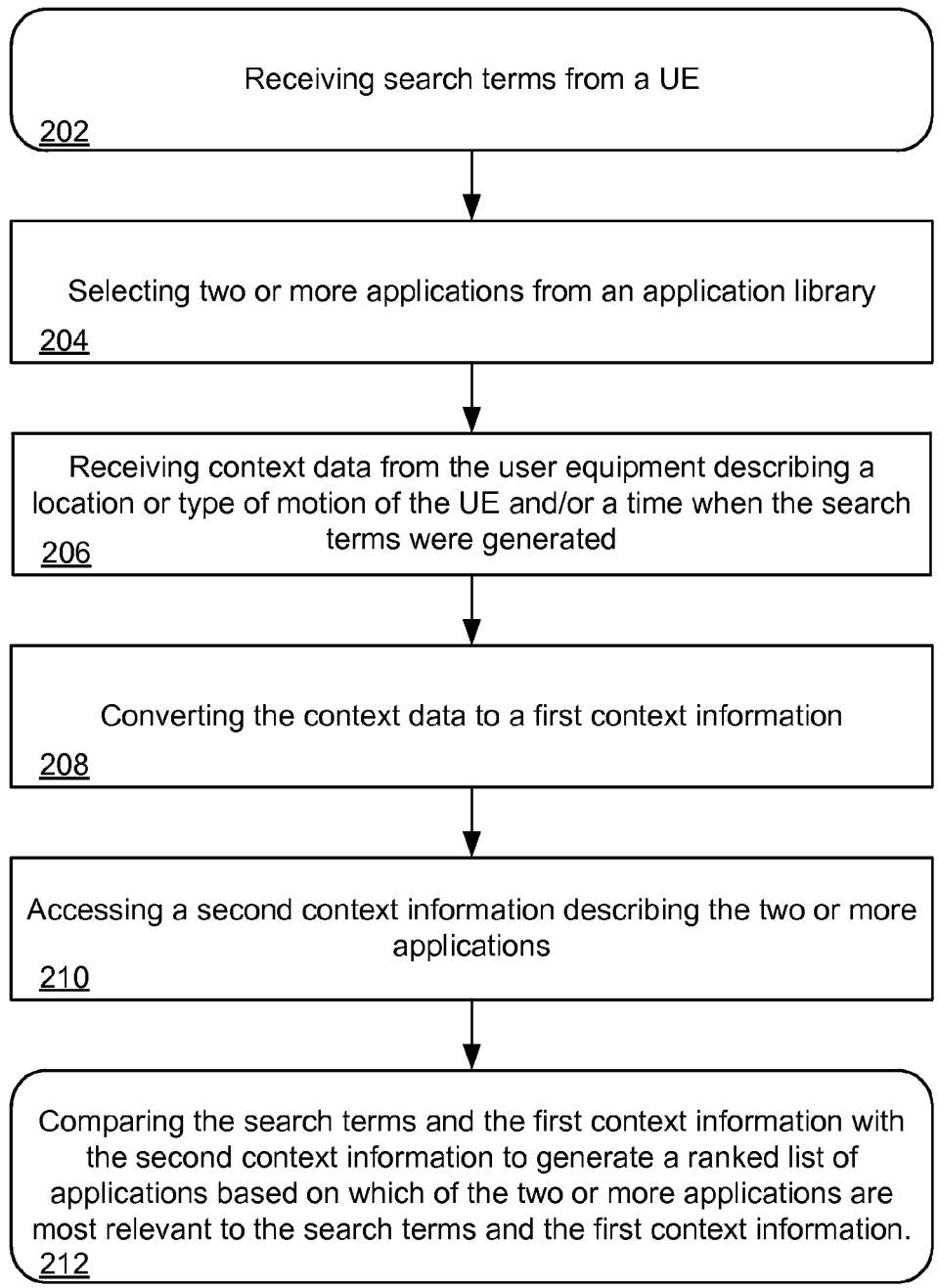
FIG. 2 illustrates another method for providing a ranked list of applications for download and installation on a user equipment.

FIG. 2 illustrates another method for providing a ranked list of applications for download and installation on a user equipment. A user can request a ranking of applications by entering one or more search terms, as is common practice on app stores such as the ANDROID MARKETPLACE. A user can also select a category of applications in which the user would like to see a ranked list of applications. The category can also be passed to remote servers in the form of search terms (e.g., restaurants, movies, sports, transportation). The method receives the search terms from the users UE in receiving operation 202. A remote server system, such as 129 illustrated in FIG. 1 can perform the receiving operation 202. The remote server system can then select two or more applications from an application library based on the received search terms in a selecting operation 204. The selecting operation 204 typically is carried out without reference to context information. However, in some embodiments, even the selecting operation 204 can consider context information when selecting the two or more applications. The method can also include a second receiving operation 206 in which context data from the UE is received. The context data can describe a location of the UE, a type of motion of the UE, and/or a time when the search terms were generated, transmitted, or received. The context data can then be converted to a first context information in a converting operation 208 that is carried out by the remote server system. In an alternative embodiment, the UE can collect context data and convert it to context information before passing the context information on to the remote server system. Second context information describing the two or more applications that were selected by the selecting operation 204 can then be accessed in an accessing operation 210. Finally, a ranked list of applications can be generated in a comparing operation 212. The comparing operation 212 involves comparing the search terms and the first context information with the second context information and generating the ranked list of applications based on which of the two or more applications selected in selecting operation 204 are most relevant to the search terms and the first context information. In other words, the user's desired category or type of application along with context information about the UE are compared to context information about the applications that the method selected as potential candidates for download and install on the UE.

The first and second context information can both be stored in a memory of the remote server system and can be accessed by a processor in order to analyze and use the first and second context information. As described earlier, the remote server system can comprise any one or more components commonly used to implement one or more remote servers such as server racks, memory, and processors.

The illustrated operations are not limited to the order indicated. For instance, the first receiving operation 202 and the second receiving operation 206 can overlap in time, take place simultaneously, or the second receiving operation 206 can occur first. As another example, the accessing operation 210 can take place at the same time as the receiving operations 202, 206 and the converting operation 208.

In alternative embodiments, the user may not provide search terms. Instead, the ranking can be generated automatically in response to an indicator from the UE. A user action may trigger the indicator. For instance, where a user opens an app store, the UE may automatically transmit context data or first context information to the remote server system. The remote server system may receive the data or first context information, access second context information associated with a set of apps, and provide a ranked list of applications to the UE for display on an initial page of the app store that the user sees. In other words, the ranking can be triggered by a user search or merely a user action.

Figure 3:
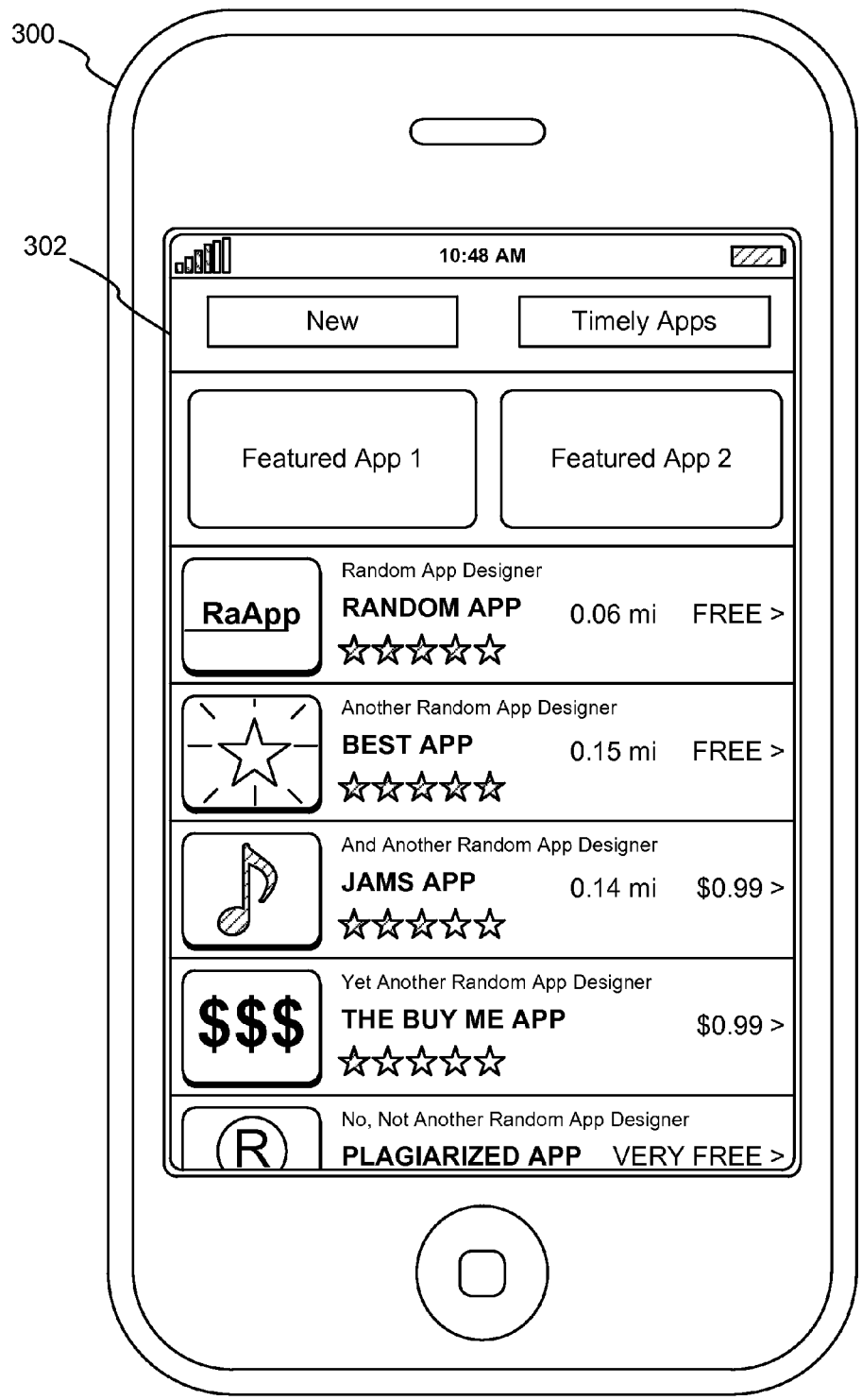
FIG. 3 illustrates a user equipment having a user interface where the apps can be searched, viewed in a ranked order, and selected for purchase and/or download.

FIG. 3 illustrates a UE 300 having a user interface 302 where the apps can be searched, viewed in a ranked order, and selected for purchase and/or download. The user interface (UI) 302 includes a list of five visible apps (many others are off screen) that have been returned as ranked search results in response to a user request for apps.

Whether the user provided specific context requests (e.g., location, time, motion type) or not, the results are ranked based on context information. In this case, between a name of the app (e.g., RANDOM APP or BEST APP) and a cost of the app (e.g., FREE or $0.99) three of the apps show a distance (e.g., 0:06 mi). This distance can represent a distance that the user is from a location associated with each app. These distances can be based on the same mode of transportation (e.g., driving) or can be based on the optimum mode of transportation for the route selected for each app. As seen, the closest app, in terms of distance, is RANDOM APP, which can be reached in 0.6 miles. The second-highest-ranked app, BEST APP, can be reached in 0.15 miles. In this embodiment, user ratings as indicated by stars, show that RANDOM APP has received poorer user ratings than BEST APP, yet because it is closer in terms of location context information describing location, RANDOM APP is ranked higher than BEST APP.

Yet, one will recognize that while context information may be the dominant weight in a ranking, other factors such as cost and user rating can still affect the ranking. For instance, BEST APP is ranked higher than JAMS APP, even though JAMS APP can be reached in less distance than BEST APP. This may be because JAMS APP must be paid for (e.g., $0.99) and BEST APP is free. Thus, where there is only a slight difference in the location context information associated with two apps, another factor, such as cost in this case, may determine the ranking between the two. This despite the fact that location has greater weight than cost in this illustration.

Some apps can be ranked lower merely because they do not include location context information. For instance, THE BUY ME APP has received putrid reviews compared to JAMS APP, and they both cost the same, yet JAMS APP is ranked higher because it has location context information, whereas THE BUY ME APP does not.

The UI 302 also includes category selection buttons, such as "New" and "Timely Apps." The "New" button can be used to put recently uploaded apps at the top of the ranking. The ranking of apps may be heavily weighted by context information describing location. The "Timely Apps" button may alter this weighting to favor apps associated with context information describing a time that is relevant to the user. On the other hand, the "Timely Apps" button may alter the weighting such that only time context information and no location context information is considered in the ranking.

The distance indicator could be replaced by a time indicator representing a time to travel to each location associated with an app. The ranking could also be based on a time of travel rather than a distance of travel.

Figure 4:
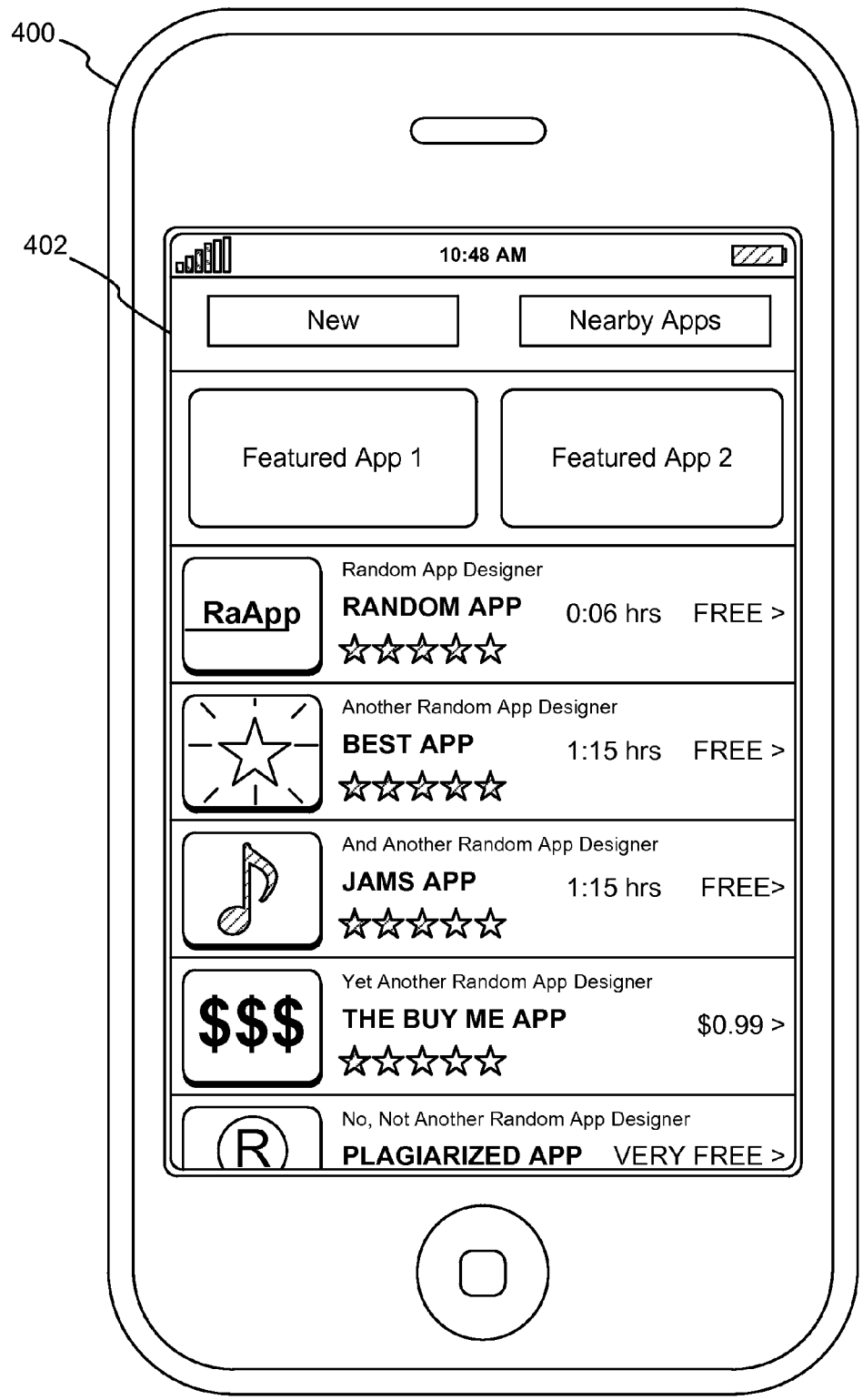
FIG. 4 illustrates a user equipment having a user interface where the apps can be searched, viewed in a ranked order, and selected for purchase and/or download.

FIG. 4 illustrates a UE 400 having a user interface 402 where the apps can be searched, viewed in a ranked order, and selected for purchase and/or download. The user interface (UI) 402 includes a list of five visible apps (many others are off screen) that have been returned as ranked search results in response to a user request for apps.

Whether the user provided specific context requests (e.g., location, time, motion type) or not, the results are ranked based on context information. In this case, between a name of the app (e.g., RANDOM APP or BEST APP) and a cost of the app (e.g., FREE or $0.99) three of the apps show a time (e.g., 0:06 hrs). This time can represent a time of travel or a time until the app is most relevant (e.g., the opening of The Fast and The Furious 9) or a time until the app is no longer relevant (e.g., the end of Happy Hour at Moe's Murderous Margaritas). As seen, the closest app, in terms of time, is RANDOM APP, which will be most relevant (or no longer relevant) in six minutes. The second-highest-ranked app, BEST APP, will be most relevant in one hour and 15 minutes. In this embodiment, user ratings as indicated by stars, show that RANDOM APP has received poorer user ratings than BEST APP, yet because it is more relevant in terms of time, RANDOM APP is ranked higher than BEST APP.

The ranking of apps may be heavily weighted by context information describing time. The "Nearby Apps" button may alter this weighting to favor apps associated with context information describing a location that is relevant to the user. On the other hand, the "Nearby Apps" button may alter the weighting such that only location context information and no time context information is considered in the ranking.

Figure 5:
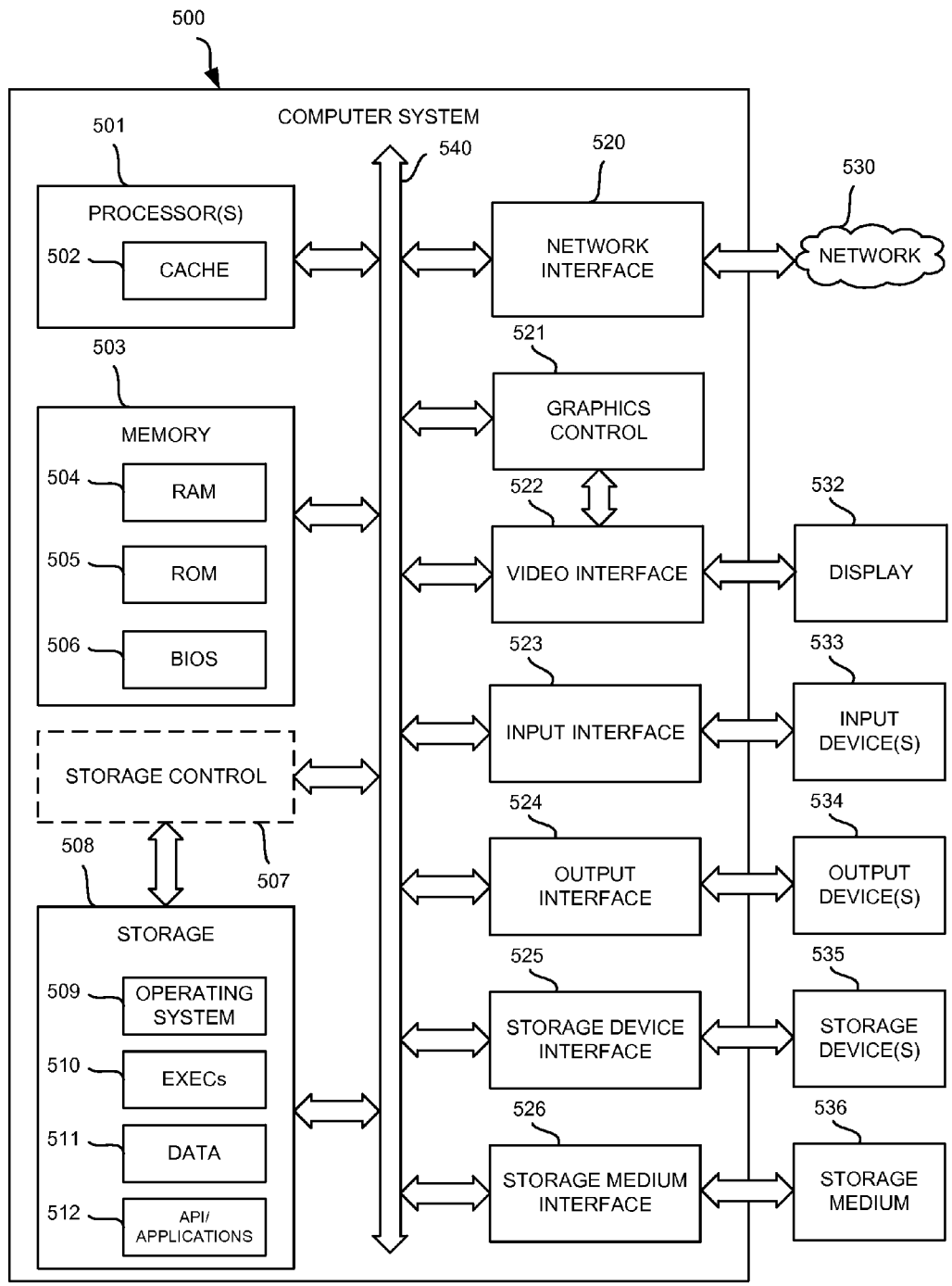
FIG. 5 shows a diagrammatic representation of one embodiment of a machine in the exemplary form of a computer system within which a set of instructions can execute for causing a device to perform or execute any one or more of the aspects and/or methodologies of the present disclosure.

The systems and methods described herein can be implemented in a machine such as a computer system in addition to the specific physical devices described herein. FIG. 5 shows a diagrammatic representation of one embodiment of a machine in the exemplary form of a computer system 500 within which a set of instructions can execute for causing a device to perform or execute any one or more of the aspects and/or methodologies of the present disclosure. The components in FIG. 5 are examples only and do not limit the scope of use or functionality of any hardware, software, embedded logic component, or a combination of two or more such components implementing particular embodiments.

Computer system 500 may include a processor 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 501 (or central processing unit(s) (CPU(s))) optionally contains a cache memory unit 502 for temporary local storage of instructions, data, or computer addresses. Processor(s) 501 are configured to assist in execution of computer readable instructions. Computer system 500 may provide functionality as a result of the processor(s) 501 executing software embodied in one or more tangible computer-readable storage media, such as memory 503, storage 508, storage devices 535, and/or storage medium 536. The computer-readable media may store software that implements particular embodiments, and processor(s) 501 may execute the software. Memory 503 may read the software from one or more other computer-readable media (such as mass storage device(s) 535, 536) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software.

The memory 503 may include various components (e.g., machine readable media) including, but not limited to, a random access memory component (e.g., RAM 504) (e.g., a static RAM "SRAM", a dynamic RAM "DRAM, etc.), a read-only component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible computer-readable media described below. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible computer-readable media described herein. Storage 508 may be used to store operating system 509, EXECs 510 (executables), data 511, APV applications 512 (application programs), and the like. Often, although not always, storage 508 is a secondary storage medium (such as a hard disk) that is slower than primary storage (e.g., memory 503). Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide nonvolatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 530, may employ a wired and/or a wireless mode of communication. In general, any network topology may be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, computer system 500 may include one or more other peripheral output devices 534 including, but not limited to, an audio speaker, a printer, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, and microcontroller. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the method steps described herein may have been discussed in a particular order, one of skill in the art will recognize that many method steps can be carried out in a different order and overlap in time without departing from the spirit of this disclosure.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A remote wireless server system comprising:
   a context information server having:
      a context manager application that:
         receives and stores search terms describing desired applications; and
         receives and stores context data associated with a user equipment describing a location or type of motion of the user equipment and/or a time when the search terms were generated; and
      a context information processor that analyzes and converts the context data into a first context information associated with the user equipment; and
   an application ranking application running on an application ranking server, the application ranking application:
      comparing the search terms and the first context information with a second context information associated with two or more applications, where the second context information includes a number of downloads or an amount of usage of each of the two or more applications that occurred:
         within a radius of a location;
         within a time range of or surrounding a time; or
         while other users were engaged in a type of motion;
         wherein the radius, location, time range, time, or type of motion is autonomously collected and provided by one or more application developers; and
      ranking the two or more applications based on the comparing to generate a ranked list of applications selected from the two or more applications.

2. The remote wireless system of claim 1, wherein the autonomously collected data has a greater impact on the second context information.

3. The remote wireless system of claim 1, wherein ranking favors applications where the one or more application developers has provided one or more of the location, radius, time, time range, or type of motion.

4. The remote wireless system of claim 3, wherein the ranking is inversely related to a magnitude of the radius or a magnitude of the time range provided by the one or more application developers.

5. A method for ranking apps for use on a wireless communications device comprising:
   receiving, via a network interface, search terms from a user equipment;
   selecting, via a processor, two or more applications from an application library as those applications most relevant to the search terms;
   receiving, via the network interface, context data from the user equipment describing a location or type of motion of the user equipment and/or a time when the search terms were generated;
   converting, via the processor, the context data to a first context information;
   accessing, in a memory, a second context information describing the two or more applications, where the second context information includes a number of downloads or an amount of usage of each of the two or more applications that occurred:
      within a radius of a location;
      within a time range of or surrounding a time; or
      while other users were engaged in a type of motion; and
   wherein the radius, location, time range, time, or type of motion is provided by one or more application developers;
   comparing, via the processor, the search terms and the first context information with the second context information to generate a ranked list of applications based on which of the two or more applications are most relevant to the search terms and the first context information.

6. The method of claim 5, wherein the radius, time range, time, and type of motion are indicated by the first context information.

7. The method of claim 5, wherein the radius, time range, time, and type of motion are indicated by the search terms.

8. The remote wireless system of claim 5, wherein the search terms describe a category of applications.

9. The method of claim 5, wherein part of the second context information is provided by application developers.

10. The method of claim 5, wherein part of the second context information is generated via analysis of the two or more applications.

11. The method of claim 5, wherein the application ranking application gives greater weight to that part of the second context information generated via analysis of the two or more applications than that part provided by application developers.

12. A user equipment comprising:
   a means for generating first context data describing a time, location, and type of motion of the user equipment;
   a means for detecting an input of search terms describing desired applications;
   a means for transmitting the first context data and the search terms to a context information server;
   a means for receiving a ranked list of applications from an application ranking server;
   wherein the applications are ranked based in part on second context information including a number of downloads or an amount of usage of each application that occurred:
      within a three-dimensional radius of a location described by the search terms;
      close to a time described by the search terms; or
      while other users were engaged in a type of motion described by the search terms;
   a means for displaying the ranked list of applications to a user;
   a means for receiving a user selection of one or more applications from the ranked list of applications; and a means for downloading and installing the one or more applications on the user equipment.

13. The user equipment of claim 12, wherein the location, time, or type of motion is described by the first context information.

14. The method of claim 5, wherein the radius, location, time, or type of motion is autonomously collected.

15. A non-transitory, tangible computer readable storage medium, encoded with processor readable instructions to perform a method for ranking applications for download and install to a user equipment, the method comprising:
   receiving search terms from a user equipment;
   selecting two or more applications from an application library as those applications most relevant to the search terms;
   receiving context data from the user equipment describing a location or type of motion of the user equipment and/or a time when the search terms were generated;
   converting the context data to a first context information;
   accessing a second context information describing the two or more applications, where the second context information includes a number of downloads or an amount of usage of each of the two or more applications that occurred within a three-dimensional radius of a location; and
   comparing the search terms and the first context information with the second context information to generate a ranked list of applications based on which of the two or more applications are most relevant to the search terms and the first context information.

16. The computer readable media of claim 15, wherein the location is indicated by the first context information.

17. The computer readable media of claim 15, wherein the location is indicated by the search terms.

* * * * *